US010216607B2

(12) United States Patent
Abdul et al.

(10) Patent No.: US 10,216,607 B2
(45) Date of Patent: *Feb. 26, 2019

(54) DYNAMIC TRACING USING RANKING AND RATING

(71) Applicant: INTERNATIONAL BUSINESS MACHINES CORPORATION, Armonk, NY (US)

(72) Inventors: Javed Iqbal Abdul, Sydney (AU); Jose Peter, Sydney (AU)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/954,734

(22) Filed: Apr. 17, 2018

(65) Prior Publication Data
US 2018/0210806 A1 Jul. 26, 2018

Related U.S. Application Data

(63) Continuation of application No. 15/659,743, filed on Jul. 26, 2017, now Pat. No. 9,983,974, which is a
(Continued)

(51) Int. Cl.
G06F 11/00 (2006.01)
G06F 11/34 (2006.01)
(Continued)

(52) U.S. Cl.
CPC ........ *G06F 11/3495* (2013.01); *G06F 11/301* (2013.01); *G06F 11/3466* (2013.01);
(Continued)

(58) Field of Classification Search
CPC ............ G06F 11/3636; G06F 11/3466; G06F 11/3664; G06F 11/366; G06F 11/3612; G06F 11/0778
See application file for complete search history.

(56) References Cited

U.S. PATENT DOCUMENTS 7,506,314 B2  3/2009  Kollmann et al.
8,756,461 B1  6/2014  Jacob et al.
(Continued)

OTHER PUBLICATIONS

IBM: List of IBM Patents or Patent Applications Treated as Related (Appendix P), Date, pp. 1-2.
(Continued)

*Primary Examiner* — Charles Ehne
(74) *Attorney, Agent, or Firm* — Michael O'Keefe

(57) ABSTRACT

Method, computer program product, and system for dynamic tracing, including monitoring a log file, wherein the log file comprises events, wherein an event comprises an event code and an event time stamp, receiving a ranking and rating table ("table"), wherein the table comprises one or more error codes and a ranking for each of the one or more error codes, matching the event code with an error code of the one or more error codes, calculating a rating for the error code, comparing the calculated rating to a rating threshold, enabling an information capture level based on the rating threshold of the calculated rating, in response to enabling the information capture level, copying events from the log file into an abbreviated log file, wherein the copied events include the error code for the calculated rating, creating an alert indicating a changed information capture level, and resetting the dynamic tracing.

1 Claim, 4 Drawing Sheets

Related U.S. Application Data continuation of application No. 15/140,884, filed on Apr. 28, 2016, now Pat. No. 10,013,329.

(51) Int. Cl.
    *G06F 11/30*    (2006.01)
    *G06F 11/36*    (2006.01)

(52) U.S. Cl.
    CPC ........ *G06F 11/3476* (2013.01); *G06F 11/366* (2013.01); *G06F 11/3636* (2013.01); *G06F 11/3664* (2013.01)

(56) References Cited

U.S. PATENT DOCUMENTS

| | | | | |
|---|---|---|---|---|
| 9,223,681 | B2* | 12/2015 | Delporte | G06F 11/3636 |
| 9,740,594 | B2 | 8/2017 | Delporte | |
| 2005/0050410 | A1* | 3/2005 | Pomaranski | G11C 29/56 |
| | | | | 714/723 |
| 2005/0278706 | A1 | 12/2005 | Garza et al. | |
| 2006/0036893 | A1 | 2/2006 | Anglin et al. | |
| 2007/0061626 | A1* | 3/2007 | Nelson | G06F 11/3688 |
| | | | | 714/38.14 |
| 2007/0277155 | A1 | 11/2007 | Casey | |
| 2008/0126828 | A1 | 5/2008 | Girouard et al. | |
| 2010/0125834 | A1 | 5/2010 | Matic | |
| 2011/0067008 | A1 | 3/2011 | Srivastava et al. | |
| 2013/0185592 | A1 | 7/2013 | Fleming et al. | |
| 2013/0332601 | A1 | 12/2013 | Nakil et al. | |
| 2014/0122943 | A1 | 5/2014 | Fukui et al. | |
| 2016/0092332 | A1* | 3/2016 | Blake | G06F 9/44589 |
| | | | | 714/35 |
| 2017/0315898 | A1 | 11/2017 | Abdul et al. | |
| 2017/0315899 | A1 | 11/2017 | Abdul et al. | |

OTHER PUBLICATIONS

Abdul et al., U.S. Appl. No. 15/954,782, filed Apr. 17, 2018, titled: "Dynamic Tracing Using Raking and Rating", pp. 1-26.

IBM: List of IBM Patents or Patent Applications Treated as Related (Appendix P), May 18, 2018, pp. 1-2.

* cited by examiner

DYNAMIC TRACING USING RANKING AND RATING

BACKGROUND

The present invention relates generally to a method, system, and computer program product for operating system log files, and more particularly to a method, system, and computer program product for tracking errors in an operating system event log based on a ranking and a rating of errors in the operating system log file.

An operating system log file records events taking place during the execution of the operating system and can be used to track the activity of the operating system and to diagnose problems or errors. A manual search of log entries in the operating system log file may be difficult and time consuming. An attempt to replicate an error may exacerbate the problem and cause further delay of corrective action to eliminate the error or problem. Similarly, a software application log file records events taking place during execution of a software application and can be used to track the activity of the software application and to diagnose problems or errors.

SUMMARY

Embodiments of the present invention disclose a method, computer program product, and system for dynamic tracing, the method, computer program product, and system including monitoring a log file, wherein the log file comprises events, wherein an event comprises an event code and an event time stamp, receiving a ranking and rating table, hereinafter ("table"), wherein the table comprises one or more error codes and a ranking for each of the one or more error codes, matching the event code with an error code of the one or more error codes, calculating a rating for the error code, comparing the calculated rating to a rating threshold, enabling an information capture level based on the rating threshold of the calculated rating, in response to enabling the information capture level, copying events from the log file into an abbreviated log file, wherein the copied events include the error code for the calculated rating, creating an alert indicating a changed information capture level, and resetting the dynamic tracing.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

The operating system of a computer may include a monitoring system which maintains an event, which is a record of activity to an operating system log file, hereinafter ("log file"). The log file may contain events of computer activity such as network activity, user access, data manipulation, software usage, processor utilization, event codes, event error conditions and error codes, among other records, and may include an event time stamp of the computer activity. An event code may indicate an error occurred, and may include an error code. A software application or application may be a computer program running on the computer. A software application log file, hereinafter ("second log file") may contain events from the software application. The log file level of capturing information may be set by a programmer and may be manually configurable.

Figure 1:
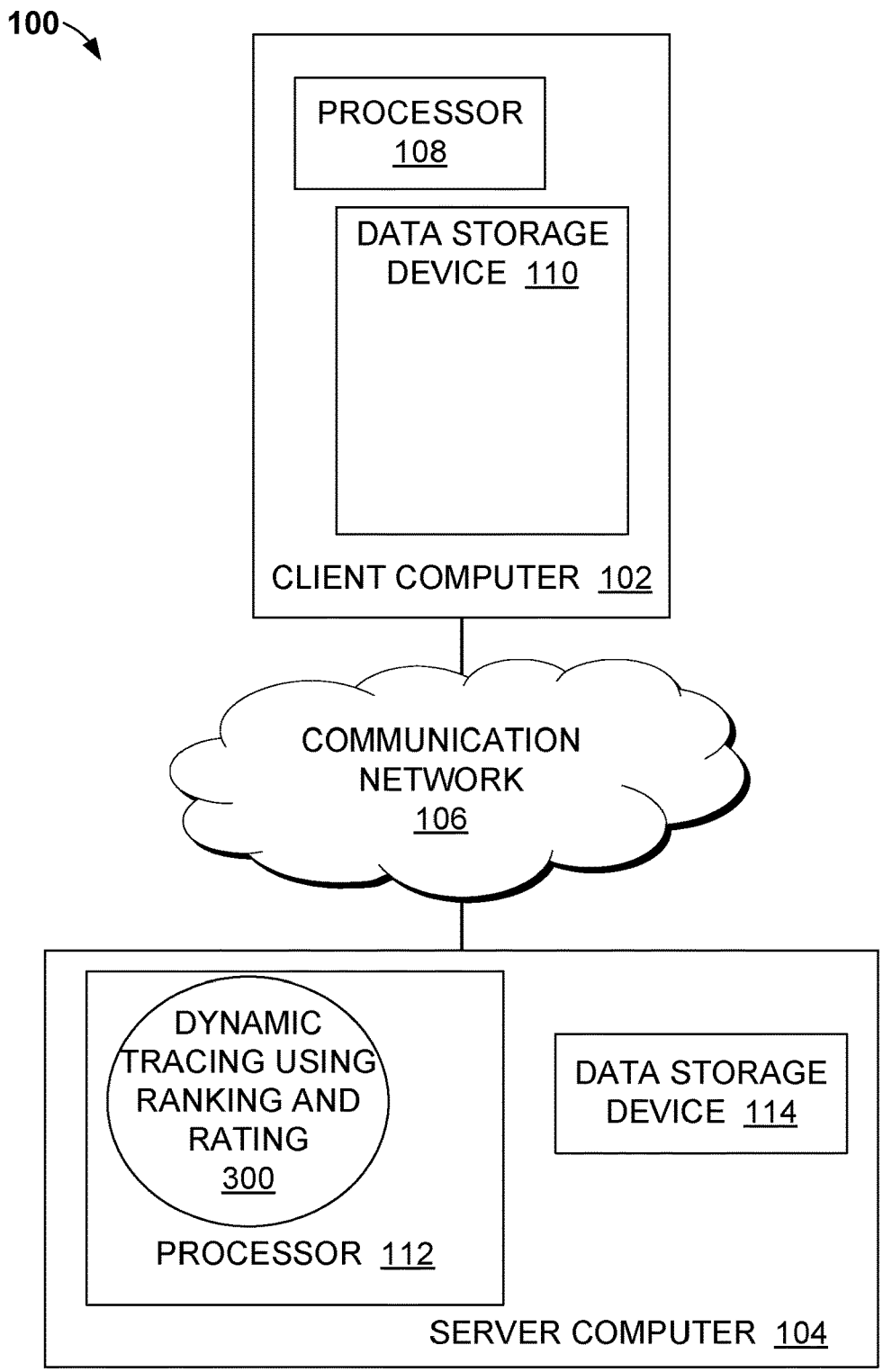
FIG. 1 is a functional block diagram illustrating a distributed data processing environment, in accordance with an embodiment of the present invention.

There may be an error table identifying a list of error codes of the computer. There may also be an application error table of error codes for the application. The log file and the second log file may each be stored in a database, for example the data storage device 114 of the server computer 104 as shown in FIG. 1. The log file and the second log file may serve as a diagnostic device, security measure or an audit trail. The log file may be accessible to a system administrator or an administrator to view and control the computer system resources and operation. The second log file may be accessible to a system administrator or an administrator of the application to view and control the application resources and operation. The log file and the second log file may contain an extensive listing of all events of computer activity. In an embodiment, there may be more than one application, and the above description may apply to each additional application running on the computer.

A computer program such as an operating system or an application may stop functioning properly. This may be called a crash or a system crash. After a system crash, the administrator may refer to the log file and gather events on identified error codes and network activity prior to the system crash to identify the event leading up to the crash. Likewise, after an application crash, the administrator of the application may refer to the second log file. Due to the extensive size of the log file or the second log file, it may be cumbersome and time consuming to sort out the events needed in the log file or the second log file to identify a condition which occurred and may be related to the system crash. In some instances, the administrator may decide it is more cost effective and less time consuming to try to replicate the error rather than search the log file. This renders the log file useless. The administrator may manually initiate different levels of debugging of the computer.

The present invention relates to automatic initiation of different levels of debugging the computer and maintaining an abbreviated log file which contains events of activity which are extracted and copied from the log file or the second log file. The abbreviated log file may contain a list of the events of activity which may be beneficial in identifying a condition which occurred prior to a system crash. The abbreviated log file may be significantly smaller in size and more manageable than the log file, and it may be easier for the administrator to access and potentially find a condition or event that may have attributed to the system crash.

One way to track errors in a log file is to extract and store an abbreviated log file of events of computer activity related to error codes, and to prioritize the extraction based on a ranking and rating of potential errors. Similarly, a second abbreviated log file may be extracted from the second log file. An embodiment by which to extract events is described in detail below by referring to the accompanying drawings in FIGS. 1 to 4. Those skilled in the art will readily appreciate that the detailed description given herein with respect to these figures is for explanatory purposes as the invention extends beyond these limited embodiments.

Referring now to FIG. 1, a functional block diagram illustrating a system 100 in a networked computer environment, in accordance with an embodiment of the present invention is shown. The system 100 may include a client computer 102 and a server computer 104. The client computer 102 may communicate with the server computer 104 via a communications network 106, (hereinafter "network"). The client computer 102 may include a processor 108, and a data storage device 110, and is enabled to interface with a user and communicate with the server computer 104. The server computer 104 may also include a processor 112 and a data storage device 114 that is enabled to run a dynamic tracing using ranking and rating program 300, (hereinafter "program"). In an embodiment, the client computer 102 may operate as an input device including a user interface while the program 300 may run primarily on the server computer 104. In an alternative embodiment, the program 300 may run primarily on the client computer 102 while the server computer 104 may be used for processing a storage of data used by the program 300.

It should be noted, however, that processing for the program 300 may, in some instances be shared amongst the client computer 102 and the server computer 104 in any ratio. In another embodiment, the program 300 may operate on more than one server computer 104, client computer 102, or some combination of server computers 104 and client computers 102, for example, a plurality of client computers 102 communicating across the network 106 with a single server computer 104.

The network 106 may include wired connections, wireless connections, fiber optic connections, or a combination thereof. In general, the network 106 can be any combination of connections and protocols that will support communications between the client computer 102 and the server computer 104. The network 106 may include various types of networks, such as, for example, a local area network (LAN), a wide area network (WAN) such as the Internet, a telecommunication network, a wireless network, a public switched network and/or a satellite network.

In various embodiments, the client computer 102 and/or the server computer 104 may be, for example, a laptop computer, tablet computer, netbook computer, personal computer (PC), a desktop computer, a personal digital assistant (PDA), a smart phone, a mobile device, or any programmable electronic device capable of communicating with the server computer 104 via the network 106. As described below with reference to FIG. 4, the client computer 102 and the server computer 104 may each include internal and external components.

In an embodiment, the system 100 may include any number of client computers 102 and/or server computers 104; however only one of each is shown for illustrative purposes only. It may be appreciated that FIG. 1 provides only an illustration of one implementation and does not imply any limitations with regard to the environments in which different embodiments may be implemented. Many modifications to the depicted environments may be made based on design and implementation requirements.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The program 300 may be implemented as a daemon in an application program, may be implement in an operating system kernel, may be part of an application running on the computer, may be plugged into an application running on the computer, or in another manner. The program 300 and associated methods are described and explained in further detail below with reference to FIGS. 2 to 4.

Figure 2:
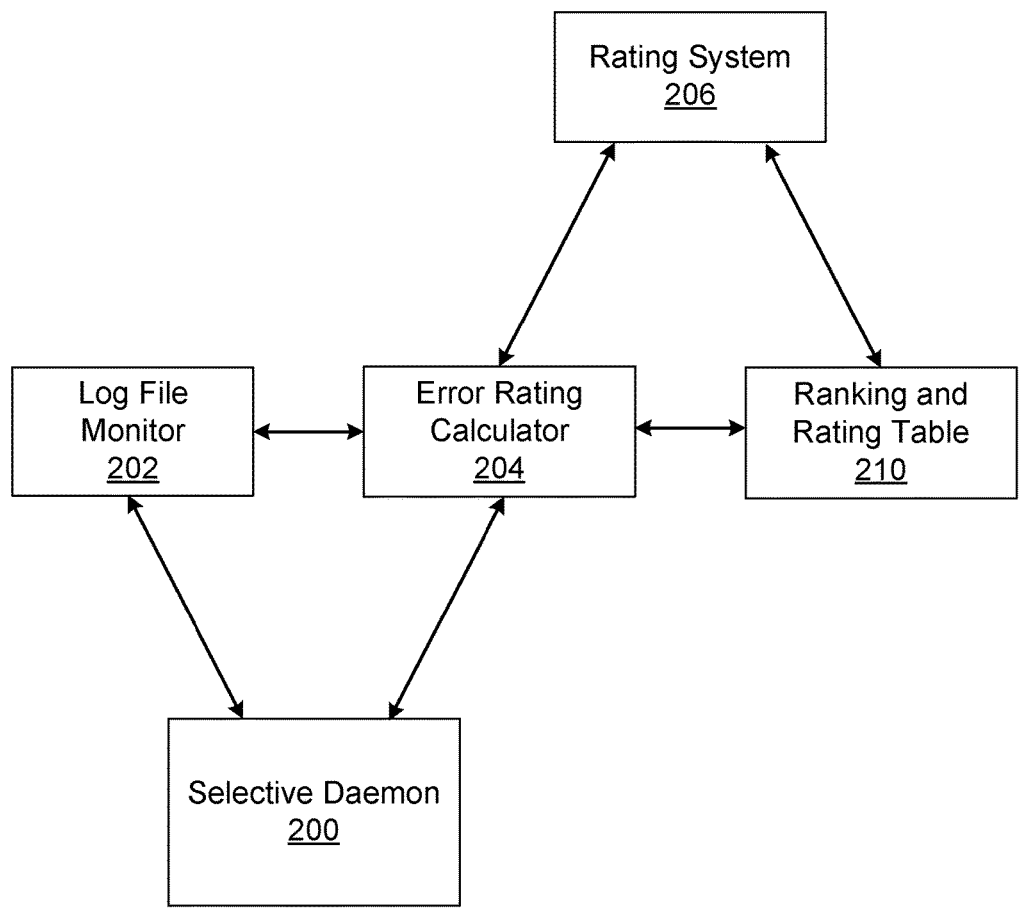
FIG. 2 is a schematic block diagram corresponding to components and algorithms associated with a dynamic tracing using ranking and rating program of FIG. 1, in accordance with an embodiment of the present invention.

Referring now to FIG. 2, one or more components and algorithms associated with the program 300 are illustrated running on the server computer 104, according to an exemplary embodiment. As used herein, the program 300 includes functionality that the operating system performs on behalf of the program 300, such as retrieving environment variables, and reading files. A selective daemon 200, may take as input, among other things, a log file monitor program 202, and an error rating calculator program 204. The error rating calculator 204 may take as input, among other things, a rating system program 206 and a ranking and rating table, hereinafter ("table") 210. The rating system program 206 may take as input, among other things, the table 210 and the error rating calculator program 204.

The log file monitor program 202 initially may continually perform an evaluation of events in the log file or the second log file which are generated by computer activity and applications which are run on the computer. The events in the log file or the second log file may contain an event code with an error code. The log file monitor program 202 may identify error codes in the event code and related information, such as location of the event code and a time stamp, from the log file or the second log file. On encountering an error code, the log file monitor program 202 may provide this information to the error rating calculator program 204. The error rating calculator program 204 may then calculate an error rating or a rating. The rating is performed using the rating system program 206.

The rating system program 206 may take as input the table 210, or receive the table 210, which is maintained by an administrator and may be changed over time by the administrator as more information is accumulated by the program 300. The table may contain a list of error codes, an assigned ranking for each of the error codes, and an occurrence counter for each of the assigned rankings. An example of the table 210 is shown below in Table 1. In an embodiment, the table may contain a list of error codes for the computer and an assigned ranking for each of the error codes of the computer. In an embodiment, the table may contain a list of error codes for an application and an assigned ranking for each of the error codes of the application.

The list of error codes which can occur in the computer may each be assigned a ranking. The error codes may be assigned a ranking based on a potential business or technical impact to the computer of the error code. The ranking may be used in a formula to calculate a rating based on the number of occurrences of the error code. The rating may be used to determine a level of frequency of extracting events from the log file and copying the extracted events to the abbreviated log file. In an embodiment, a ranking may be assigned for each of the error codes of the application.

In an example, there may be 200 error codes and there may be rankings 1 through 10. A ranking between 1 and 4 may be considered to have a minimal or low impact on the functionality of the computer, for example a single authentication failure or a generic user error. A ranking between 5 and 8 may be considered to have a medium disruption in terms of the functionality of the computer, for example, memory issues, thread hangs, diamond deadlock situations, etc. A ranking of 9 or 10 may be considered to have a high disruption on the functionality of the computer, for example, these error codes can bring the production, usage or functionality of the computer to a halt and thus impair the software development life cycle (SDLC). The SDLC is a framework defining tasks performed at each step in the software development process. The ranking and sorting of levels of low, medium and high may be dynamically updated by the administrator. In an embodiment, the ranking and sorting levels of low, medium and high of the application may be set by an application administrator.

Table 1 is shown below as an example of the table 210. The first column is a ranking assigned for each of the error codes and is identified as "y". The second column is an error code which is assigned to that ranking. In an example there may be 10 rankings, 1 to 10. Table 1 shows a sample of 4 different rankings (1, 4, 7 and 10), where ranking 1 has 3 error codes, ranking 4 has 2 error codes and rankings 7 and 10 each have one error code. There may be several error codes per ranking. In the case of 200 error codes, and 10 rankings, each of the 10 error codes may have, for example, 20 error codes assigned to a ranking.

TABLE 1

| Ranking (y) | Error Code |
|---|---|
| 1 | Error1 |
|  | Error17 |
|  | Error91 |
| 4 | Error167 |
|  | Error191 |
| 7 | Error85 |
| 10 | Error25 |

An occurrence counter for each of the assigned ranking may identify which rating calculation to follow for each occurrence of an error code in a ranking. For example, an occurrence counter may range from 1 to 10. In each instance of an occurrence within a ranking, there is a related rating calculation. The rating calculation may show a current value of the rating and a calculation to update the rating to a new rating dependent on the occurrence counter.

The error rating calculator program 204 may use the table 210 in combination with the log file monitor program 202 and the rating system program 206 to determine the rating. The log file monitor program 202 may monitor the log file, and match an event code of the log with an error code of the table 210. The error rating calculator program 204 may calculate the rating. The rating may be the rating of the error code and may be updated over time as the error code is repeated. The rating calculation is based on the ranking of the error code, and an occurrence counter of the error code.

Table 2 is shown below as an example of calculations made by the error rating calculator program 204. The first column and second columns show a subset of the information shown in table 1, with the example of rankings of 1, 4, 7, and 10. There is one error code shown per ranking. The third column is an occurrence counter for the ranking and is identified as "z". The occurrence counter is the number of times a particular error code has occurred. The fourth column is the result of the error rating calculator program 204, or a rating calculation for the value of the rating, the rating is identified as "x". The rating will increase for each occurrence of an error code.

TABLE 2

| Ranking (y) | Error Code | Occurrence Counter (z) | Rating Calculation (x) new value of x = (old value of x) + (y + z) |
|---|---|---|---|
| 1 | Error1 | 1 | First, Rating is $x = 0 + (1 + 1) = 2$ (New value of x is 2) |
|  |  | 2 | Second Instance, Rating is $x = 2 + (1 + 2) = 5$ |
|  |  | 3 | Third Instance, Rating is $x = 5 + (1 + 3) = 9$ |
|  |  | 4 | Fourth Instance, Rating is $x = 9 + (1 + 4) = 14$ |
|  |  | 5 | Fifth Instance, Rating is $x = 14 + (1 + 5) = 20$ |
|  |  | 6 | Sixth Instance, Rating is $x = 20 + (1 + 6) = 27$ |
|  |  | 7 | Seventh Instance, Rating is |

TABLE 2-continued

| Ranking (y) | Error Code | Occurrence Counter (z) | Rating Calculation (x) new value of x = (old value of x) + (y + z) |
|---|---|---|---|
| | | | x = 27 + (1 + 7) = 35 |
| | | 8 | Eighth Instance, Rating is x = 35 + (1 + 8) = 44 |
| | | 9 | Ninth Instance, Rating is x = 44 + (1 + 9) = 54 |
| 4 | Error 167 | 1 | First, Rating is x = 0 + (4 + 1) = 5 (New value of x is 5) |
| | | 2 | Second Instance, Rating is x = 5 + (4 + 2) = 11 |
| | | 3 | Third Instance, Rating is x = 11 + (4 + 3) = 18 |
| | | 4 | Fourth Instance, Rating is x = 18 + (4 + 4) = 26 |
| | | 5 | Fifth Instance, Rating is x = 26 + (4 + 5) = 35 |
| | | 6 | Sixth Instance, Rating is x = 35 + (4 + 6) = 45 |
| | | 7 | Seventh Instance, Rating is x = 45 + (4 + 7) = 56 |
| 7 | Error85 | 1 | First, Rating is x = 0 + (7 + 1) = 8 (New value of x is 8) |
| | | 2 | Second Instance, Rating is x = 8 + (7 + 2) = 17 |
| | | 3 | Third Instance, Rating is x = 17 + (7 + 3) = 27 |
| | | 4 | Fourth Instance, Rating is x = 27 + (7 + 4) = 38 |
| | | 5 | Fifth Instance, Rating is x = 38 + (7 + 5) = 50 |
| 10 | Error25 | 1 | First, Rating is x = 0 + (10 + 1) = 11 (New value of x is 11) |
| | | 2 | Second Instance, Rating is x = 11 + (10 + 2) = 23 |
| | | 3 | Third Instance, Rating is x = 23 + (10 + 3) = 36 |
| | | 4 | Fourth Instance, Rating is x = 36 + (10 + 4) = 50 |

The rating calculation for the rating, or x, will be zero to start, x=0. If there is an error code of Error1, per the table, the ranking is 1, or y=1. On the first occurrence of Error1, the error rating calculator program 204 will use the rating calculation to determine a new value of x. The new value of x is equal to the old value of x plus the ranking, which is y, plus the occurrence counter, which is z:

(new value of $x$)=(old value of $x$)+$y$+$z$

In the example of an Error1, first occurrence:

(new value of $x$)=0+1+1=2

Continuing in an example of an Error1, second occurrence:

(new value of $x$)=2+1+2=5

In an example of an Error85, the ranking per the table is 7. For the first occurrence:

(new value of $x$)=0+7+1=8

Continuing in an example of an Error85, second occurrence:

(new value of $x$)=8+7+2=17

The level of the rating may determine an appropriate level of capturing information from the log file into the abbreviated log file. In an embodiment, the level of the rating of the application may determine an appropriate level of capturing information from the second log file into the second abbreviated log file.

The results of the error rating calculator program 204 may be used by the program 300, as described below in regards to FIG. 3. The result of the error rating calculator program 204 will produce the rating. Depending on a value range of the rating, different levels of capturing events from the log file into the abbreviated log file may be performed. In an embodiment, there may be three levels of capturing information, based on the rating. The three levels of capturing information may be Trace Mode, Debug Mode and Info Mode.

If the rating is equal or greater than 90, or a high rating threshold, then the highest level of capturing events from the log file into the abbreviated log file may occur, which is Trace Mode. In Trace Mode, detail of the actions and errors generated in the computer may be captured from the log file and copied into the abbreviated log file. Trace Mode may capture a large quantity of events in a short period of time. For example, 200 MB of events may be captured in 2 minutes from the log file and copied to the abbreviated log file.

If the rating is equal or greater than 50, or a medium rating threshold, but less than 90, then a medium level of capturing events from the log file into the abbreviated log file may occur, which is Debug Mode. In Debug Mode, a less frequent copying of events from the log file into the abbreviated log file may occur, compared to the Trace Mode.

If the rating is equal or greater than 20, or a low rating threshold, but less than 50, then a low level of capturing events from the log file into the abbreviated log file may occur, which is Info Mode. In Info Mode, a low sampling of events may be capture from the log file into the abbreviated log file. If the rating is less than 20, then there may be little or no events copied from the log file into the abbreviated log file, and the level of capturing events from the log file into the abbreviated log file may remain at a default level.

The number of levels for the value range of the rating, the calculation of the rating, and the specific threshold values of ratings of 20, 50 and 90, may be dynamically changed by the administrator depending on the computer functionality over time as more information is collected. The frequency of events copying from the log file into the abbreviated log file for each of the three modes, Trace Mode, Debug Mode and Info Mode may be defined by the administrator and may change. A description of the three levels of capturing information follows below with respect to FIG. 3.

Figure 3:
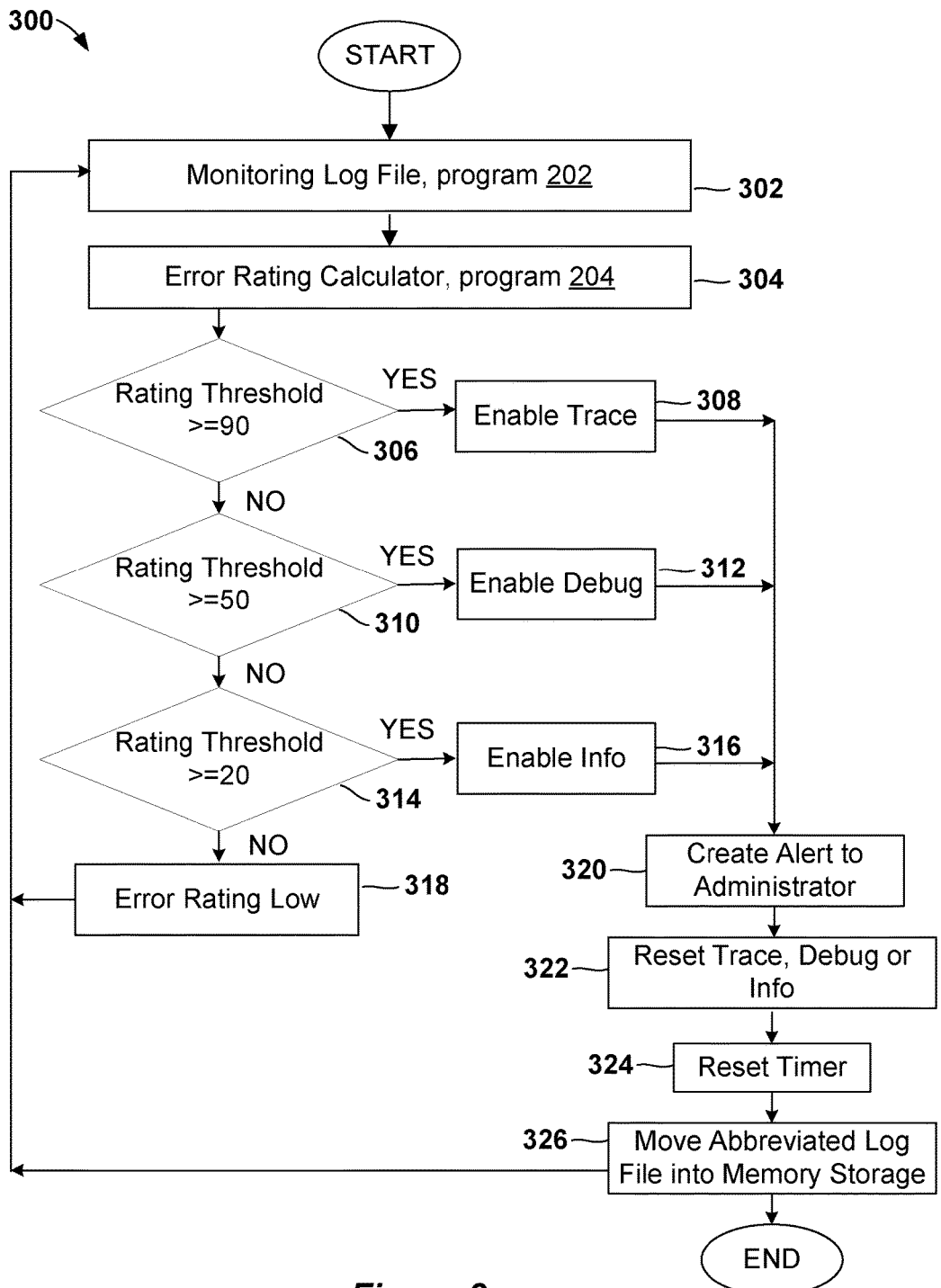
FIG. 3 is a flowchart depicting operational steps of the dynamic tracing using ranking and rating program within the distributed data processing environment of FIG. 1, in accordance with an embodiment of the present invention.

Referring now to FIG. 3, and with continued reference to FIGS. 1 and 2, a flowchart depicting operational steps of a dynamic tracing using ranking and rating program 300, (hereinafter "program") is shown in accordance with an embodiment of the present invention. The program 300 may be configured to create an abbreviated log file by extracting events from the log file of events of computer activity related to error codes.

First, the program 300 monitors the log file, as described previously regarding the log file monitor program 202, at step 302. Next, the program 300 calculates the rating, as described previously regarding the error rating calculator program 204, at step 304.

Next, the program 300 compares the rating to a high threshold value of 90, at step 306. If the rating is equal or greater than 90, then the program 300 will continue to enable a Trace Mode at step 308, as described above. In an embodiment, the Trace Mode will occur at 12 occurrences of Ranking 1 error codes, at 11 occurrences of Ranking 4 error codes, at 9 occurrences of Ranking 7 error codes and at 8 occurrences of Ranking 10 error codes. The program 300 will then create an alert specifying that the Trace Mode has been enabled and send the alert to the administrator at step 320.

If the rating is less than 90 at step 306, then the program 300 continues to compare the rating to a medium threshold value of 50, at step 310. If the rating is equal or greater than 50, then the program 300 will continue to enable a Debug Mode at step 312, as described above. In an embodiment, the Debug Mode will occur at 9 occurrences of Ranking 1 level error codes, at 7 occurrences of Ranking 4 error codes, at 5 occurrences of Ranking 7 error codes, and at 4 occurrences of Ranking 10 error codes. The program 300 will then create an alert that the Debug Mode has been enabled and send the alert to the administrator at step 320.

If the rating is less than 50 at step 310, then the program 300 continues to compare the rating to a low threshold value of 20, at step 314. If the rating is equal or greater than 20, then the program 300 will enable an Info mode, or an information mode, at step 316, as described above. In an embodiment, the Info Mode will occur at 5 occurrences of Ranking 1 error codes, at 4 occurrences of Ranking 4 error codes, at 3 occurrences of Ranking 7 error codes and at 2 occurrences of Ranking 10 error codes. The program 300 will then create an alert that the Info Mode has been enabled and send the alert to the administrator, at step 320.

If the rating is less than 20 at step 314, then the program 300 continues to an error rating low state or the default level, at step 318. Then the program will continue to monitor the rating, returning to step 302 as described above. The level of capturing events from the log file into the abbreviated log file may remain at the default level.

After each of the steps: enable Trace Mode at step 308, enable Debug Mode at step 312 or enable Info Mode at step 316, the program 300 will proceed to create an alert to the administrator, at step 320. The alert may be an email, a text, or a log entry in a database, for example the data storage device 114. The alert may be sent to the administrator or an owner of the computer. The alert may have specific details regarding whether the program is in Trace Mode, Debug Mode or Info mode. The alert may have event time stamps and information on the event codes and related error codes which have been captured in the abbreviated log file. The administrator will have access to the log file and the abbreviated log file. The administrator may be able to take corrective action, such as stopping the computer activity which may have errors in the log file.

Next the program 300 may reset the rating to 0 at step 322. This may be referred to as a reset of the dynamic tracing. The reset of the rating may be done by the administrator, or may occur at a frequency as determined by the administrator. In an example, the rating may be reset every six hours. A timer may be reset at step 324. The timer may be configurable and measure elapsed time, or it may be actual time where there is a start time and a configurable end time. The occurrence counter may be reset. The abbreviated log file may be moved to a data storage or memory storage for analysis by the administrator or by a user, for example, the data storage device 114, at step 326. Similarly, upon the reset of the rating for the application, the second abbreviated log file may be stored in a second data storage.

Then, the program 300 will return to the start of the program at step 302 as described above and the capture level will return to the default level.

In an embodiment, the program 300 may be run for the application.

The program 300 may be used to automatically create an abbreviated log file for use of the administrator or a user to assist in quickly identifying a computer activity or application which may be failing. This may assist in quick analysis and corrective action for the computer activity or application. The program 300 is an intelligent dynamic tracing system which automatically calculates and enables debugging of a computer and automatically initiates different levels of debugging in a computer, without manual intervention nor the restart of a daemon.

Figure 4:
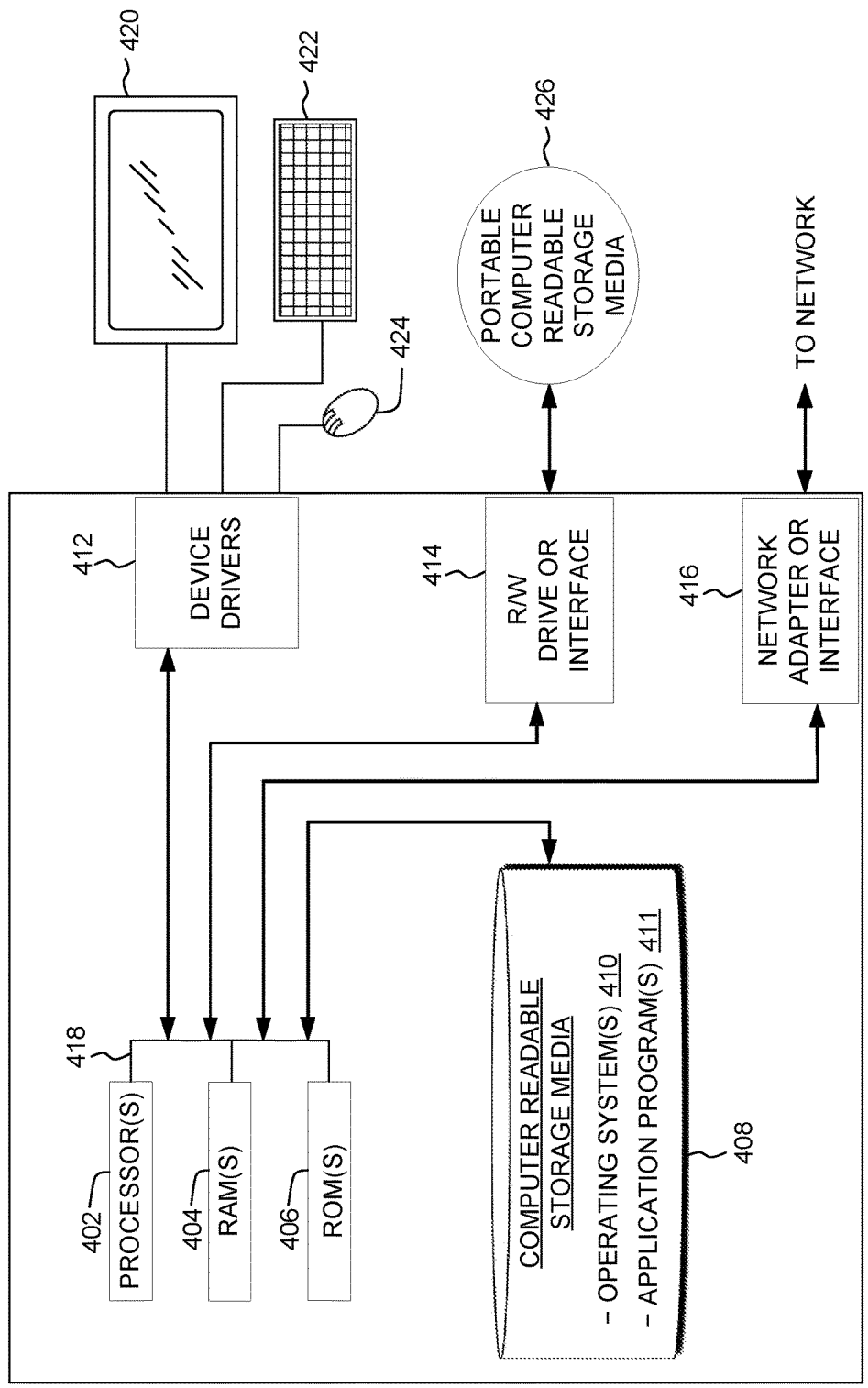
FIG. 4 is a functional block diagram of components of the proxy server computer executing the dynamic tracing using ranking and rating program, in accordance with an embodiment of the present invention.

Referring now to FIG. 4, a block diagram of components of a computing device, such as the client computer 102 or the server computer 104, of the system 100 of FIG. 1, in accordance with an embodiment of the present invention is shown. It should be appreciated that FIG. 4 provides only an illustration of one implementation and does not imply any limitations with regard to the environments in which different embodiments may be implemented. Many modifications to the depicted environment may be made.

The computing device may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, the program 300, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory, memory storage, or any other computer-readable tangible storage device that can store a computer program and digital information.

The computing device may also include the interface 414 to read from and write to one or more portable computer readable storage media 426. Application programs 411 on the computing device may be stored on one or more of the portable computer readable storage media 426, read via the interface 414 and loaded into the respective computer readable storage media 408.

The computing device may also include the interface 416, such as a TCP/IP adapter card or wireless communication adapter (such as a 4G wireless communication adapter using OFDMA technology). Application programs 411 on the computing device may be downloaded to the computing device from an external computer or external storage device via a network (for example, the Internet, a local area network or other wide area network or wireless network) and the interface 416. From the interface 416, the programs may be loaded onto computer readable storage media 408. The network may comprise copper wires, optical fibers, wireless transmission, routers, firewalls, switches, gateway computers and/or edge servers.

The computing device may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, the interface 414 and the interface 416 may comprise hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for dynamic tracing, the computer program product comprising:

one or more computer-readable storage media and program instructions stored on the one or more computer-readable storage media, the program instructions comprising:

program instructions to monitor a log file, wherein the log file comprises events, wherein an event comprises an event code, an event time stamp, computer network activity, user access, data manipulation, software usage, processor utilization, and software application activity;

program instructions to receive a ranking and rating table ("table"), wherein the table comprises one or more error codes and a ranking for each of the one or more error codes;

program instructions to match the event code with an error code of the one or more error codes;

program instructions to calculate a rating for the error code, wherein program instructions to calculate the rating comprises program instructions to add the ranking of the error code, an occurrence counter of the error code, and a previous rating of the rating;

program instructions to compare the calculated rating to a rating threshold, wherein program instructions to compare the calculated rating to a rating threshold further comprises program instructions to enable a trace level information capture based on the calculated rating exceeding a high rating threshold, program instructions to enable a debug level information capture based on the calculated rating exceeding on a medium rating threshold, and program instructions to enable an info level information capture based on the calculated rating exceeding a low rating threshold, wherein the rating threshold is dynamically configurable;

program instructions to enable an information capture level based on the rating threshold of the calculated rating;

program instructions to start a timer when the information capture level is enabled, wherein the timer is reset after a configurable elapsed time;

in response to program instructions to enable the information capture level, program instructions to copy events from the log file into an abbreviated log file, wherein the copied events include the error code for the calculated rating;

program instructions to create an alert indicating a changed information capture level;

program instructions to move the abbreviated log file into a memory storage;

program instructions to reset the rating and resetting an occurrence counter;

program instructions to reset a configurable timer;

program instructions to reset the information capture level to a default level; and program instructions to reset the dynamic tracing.

* * * * *